US011002969B2

(12) United States Patent
Schaub et al.

(10) Patent No.: US 11,002,969 B2
(45) Date of Patent: May 11, 2021

(54) LIGHT PROJECTION SYSTEM INCLUDING AN OPTICAL ASSEMBLY FOR CORRECTION OF DIFFERENTIAL DISTORTION

(71) Applicant: Facebook Technologies, LLC, Menlo Park, CA (US)

(72) Inventors: Michael Patrick Schaub, Redmond, WA (US); Byron Taylor, Redmond, WA (US); Yijing Fu, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 253 days.

(21) Appl. No.: 16/242,974

(22) Filed: Jan. 8, 2019

(65) Prior Publication Data

US 2019/0227322 A1 Jul. 25, 2019

Related U.S. Application Data

(60) Provisional application No. 62/621,946, filed on Jan. 25, 2018, provisional application No. 62/622,066, filed on Jan. 25, 2018.

(51) Int. Cl.
*G02B 26/08* (2006.01)
*G02B 27/01* (2006.01)
*G02B 26/10* (2006.01)

(52) U.S. Cl.
CPC ..... *G02B 27/0172* (2013.01); *G02B 26/0816* (2013.01); *G02B 26/10* (2013.01); *G02B 2027/011* (2013.01)

(58) Field of Classification Search
CPC ............ G02B 27/0172; G02B 26/0816; G02B 26/10; G02B 2027/011; G02B 2027/0178
See application file for complete search history.

(56) References Cited

U.S. PATENT DOCUMENTS

| 5,325,386 A * | 6/1994 | Jewell ..................... H01S 5/423 372/50.124 |
| 5,334,991 A | 8/1994 | Wells et al. |

(Continued)

FOREIGN PATENT DOCUMENTS

| CN | 101589328 A | 11/2009 |
| CN | 101726856 A | 6/2010 |

(Continued)

OTHER PUBLICATIONS

The State Intellectual Property Office of People's Republic of China, Office Action, Chinese Patent Application No. 201910069106. X, dated Nov. 13, 2020, 19 pages.

*Primary Examiner* — Euncha P Cherry
(74) *Attorney, Agent, or Firm* — Fenwick & West LLP

(57) ABSTRACT

A light projection system includes a light source configured to emit image light and an optical assembly configured to provide positive optical power to the image light and optically correct the image light. The optical assembly comprises a plurality of optical elements configured to correct differential distortion related to the image light across a field of view (FOV) within a threshold amount. The differential distortion is corrected based in part on asymmetry of the plurality of optical elements relative to an optical axis shared by the plurality of optical elements.

20 Claims, 9 Drawing Sheets

(56) References Cited

U.S. PATENT DOCUMENTS

| | | | |
|---|---|---|---|
| 5,513,041 A * | 4/1996 | Togino | G02B 27/0172 |
| | | | 359/434 |
| 5,903,397 A | 5/1999 | Melville et al. | |
| 9,581,818 B2 * | 2/2017 | Suzuki | G02B 17/08 |

FOREIGN PATENT DOCUMENTS

| | | |
|---|---|---|
| CN | 101995661 A | 3/2011 |
| CN | 103649816 A | 3/2014 |
| CN | 103782222 A | 5/2014 |

* cited by examiner

LIGHT PROJECTION SYSTEM INCLUDING AN OPTICAL ASSEMBLY FOR CORRECTION OF DIFFERENTIAL DISTORTION

CROSS REFERENCE TO RELATED APPLICATIONS

This application claims the benefit of U.S. Provisional Application No. 62/621,946, filed Jan. 25, 2018 and U.S. Provisional Application No. 62/622,066, filed Jan. 25, 2018, which are incorporated by reference in their entirety.

BACKGROUND

The present disclosure generally relates to optical collimators, and specifically relates to a light projection system that includes an optical assembly for correction of differential distortion.

Headsets in artificial reality applications typically display image content via some form of display. For artificial reality applications it is desirable to have a light headset of a small form factor. But, designing a display for such a headset is difficult. In particular, in cases where the headset is something akin to a set of eyeglasses. A light headset can be implemented by coupling a strip source for emitting image light with a scan mirror for scanning of a viewer scan field to build a scene for the viewer. However, a projection system based on the strip source coupled to the scan mirror introduces image distortion across a field of view as a result of the scanning process.

SUMMARY

Embodiments of the present disclosure relate to a light projection system that includes a light source configured to emit image light and an optical assembly configured to provide positive optical power to the image light and optically correct the image light. The optical assembly comprises a plurality of optical elements configured to correct differential distortion related to the image light across a field of view (FOV) within a threshold amount, based on asymmetry of the plurality of optical elements relative to an optical axis shared by the plurality of optical elements.

An eyeglass-type platform representing a near-eye display (NED) can integrate the light projection system. The NED further includes a scanning mirror coupled to the light projection system. The NED may be part of an artificial reality system. The scanning mirror of the NED is configured to scan the optically corrected image light in at least one dimension of the FOV and direct the scanned image light to an eye box of the NED corresponding to a location of a user's eye.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a near-eye display (NED), a mobile device or computing system, or any other hardware platform capable of providing artificial reality content to one or more viewers.

A compact light projection system for correcting differential distortion is presented herein. The light projection system includes one or more light sources and an optical assembly. The one or more light sources are configured to emit image light. In some embodiments, the one or more light sources are strip sources. The optical assembly includes a plurality of optical elements (e.g., lenses) that are arranged in-line (e.g., versus off-axis). In some embodiments, the optical elements are axially symmetric but with decenter. For example, the symmetry may be adjusted by allowing one or more rotationally symmetric elements to decenter. In some embodiments, system symmetry may be broken by using one or more non-rotationally symmetric optical elements. In some other embodiments, system symmetry may be broken by using decentered non-rotationally symmetric optical elements.

The light projection system presented herein may be part of a NED that is part of an artificial reality system configured to present content via the NED to the user.

Figure 1A:
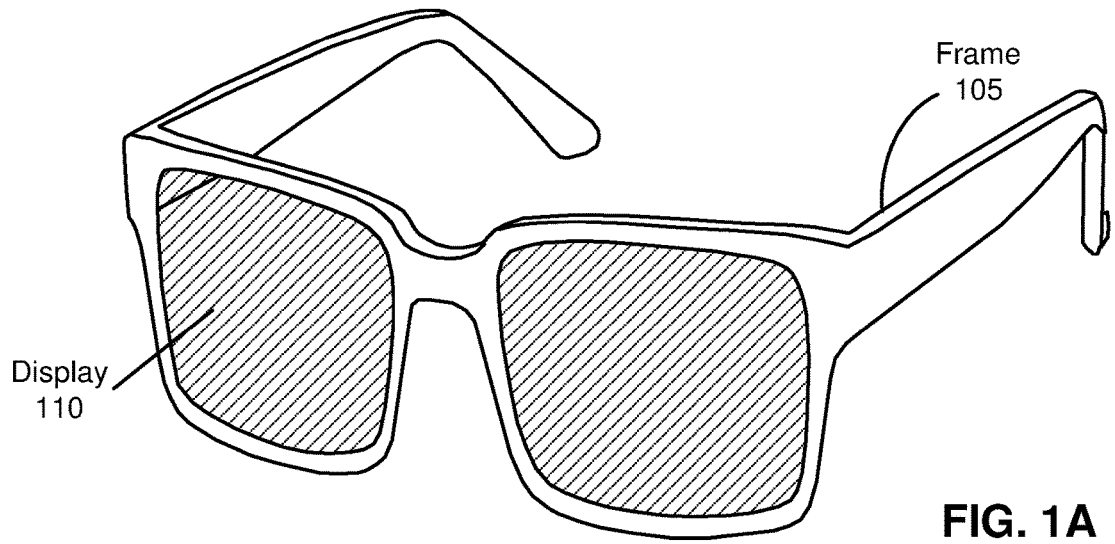
FIG. 1A is a diagram of a near-eye-display (NED), in accordance with one or more embodiments.

FIG. 1A is a diagram of a NED 100, in accordance with one or more embodiments. In some embodiments, the NED 100 may be referred to as a HMD. The NED 100 presents media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 may be part of an artificial reality system (not shown). The NED 100 is generally configured to operate as an artificial reality NED. In some embodiments, the NED 100 may augment views of a physical, real-world environment with computer-generated elements (e.g., images, video, sound, etc.).

The NED 100 shown in FIG. 1A includes a frame 105 and a display 110. The frame 105 is coupled to one or more optical elements which together display media to users. In some embodiments, the frame 105 may represent a frame of eye-wear glasses. The display 110 is configured for users to see the content presented by the NED 100. As discussed below, the display 110 includes at least one display assembly (not shown) for directing one or more image light to an eye of the user. The display assembly includes a light projection system presented herein for correcting differential distortion.

Figure 1B:
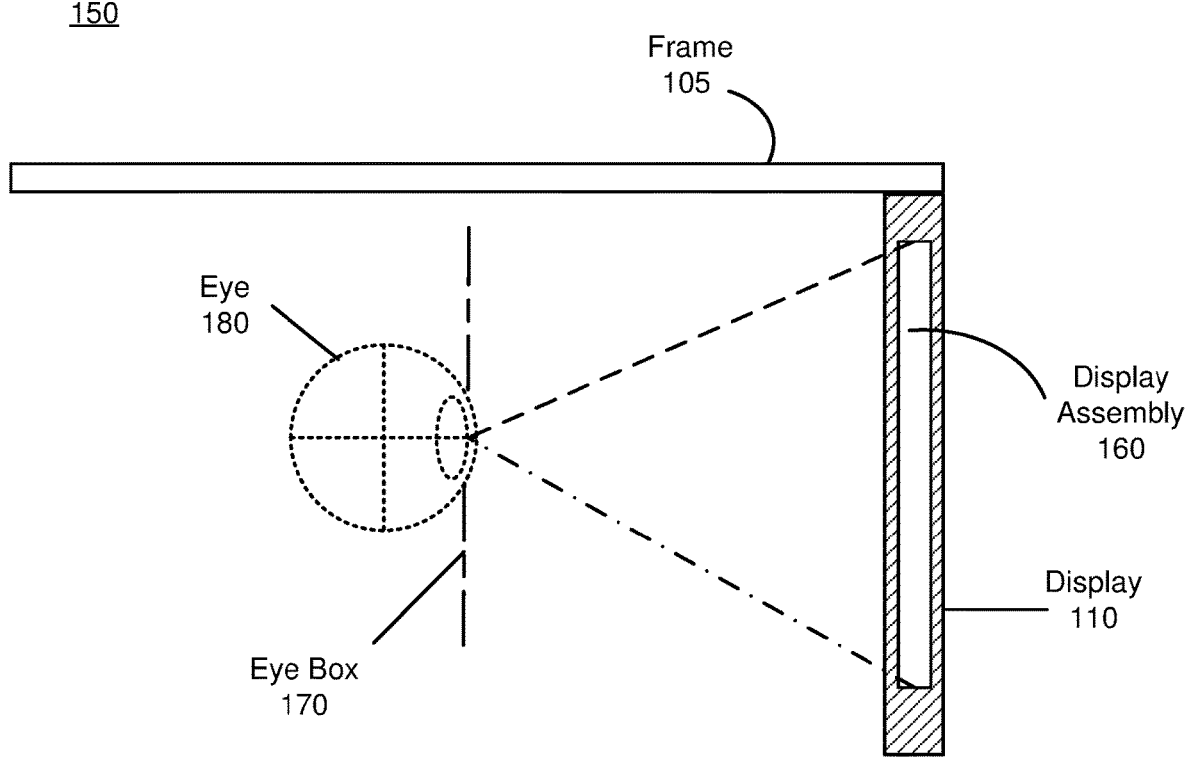
FIG. 1B is a cross-section of an eyewear of the NED illustrated in FIG. 1A, in accordance with one or more embodiments.

FIG. 1B is a cross-section 150 of the NED 100 illustrated in FIG. 1A, in accordance with one or more embodiments. The cross-section 150 includes at least one display assembly 160 integrated into the display 110 and an eye box 170. The eye box 170 is a location where an eye 180 is positioned when the user wears the NED 100. For purposes of illustration, FIG. 1B shows the cross section 150 associated with a single eye 180 and a single display assembly 160, but in alternative embodiments not shown, another display assembly which is separate from the display assembly 160 shown in FIG. 1B, provides image light to another eye 180 of the user.

The display assembly 160 is configured to direct the image light to the eye 180 through the eye box 170. In some embodiments, when the NED 100 is configured as an AR NED, the display assembly 160 also directs light from a local area surrounding the NED 100 to the eye 180 through the eye-box 170.

The display assembly 160 may be composed of one or more materials (e.g., plastic, glass, etc.) with one or more refractive indices that effectively minimize the weight and widen a field of view (FOV) of the NED 100. The display assembly 160 includes an optical assembly with a plurality of optical elements. The optical elements may act to, e.g., correct aberrations in image light emitted from the display assembly 160, magnify image light emitted from the display assembly 160, some other optical adjustment of image light emitted from the display assembly 160, or some combination thereof. The example for optical elements may include an aperture, a Fresnel lens, a convex lens, a concave lens, a liquid crystal lens, a diffractive element, a waveguide, a filter, a polarizer, a diffuser, a fiber taper, one or more reflective surfaces, a polarizing reflective surface, a birefringent element, or any other suitable optical element that affects image light emitted from the display assembly 160. More details about structure and operation of the optical assembly of the display assembly 160 are provided in conjunction with FIG. 2 and FIGS. 4A-4C.

Figure 2:
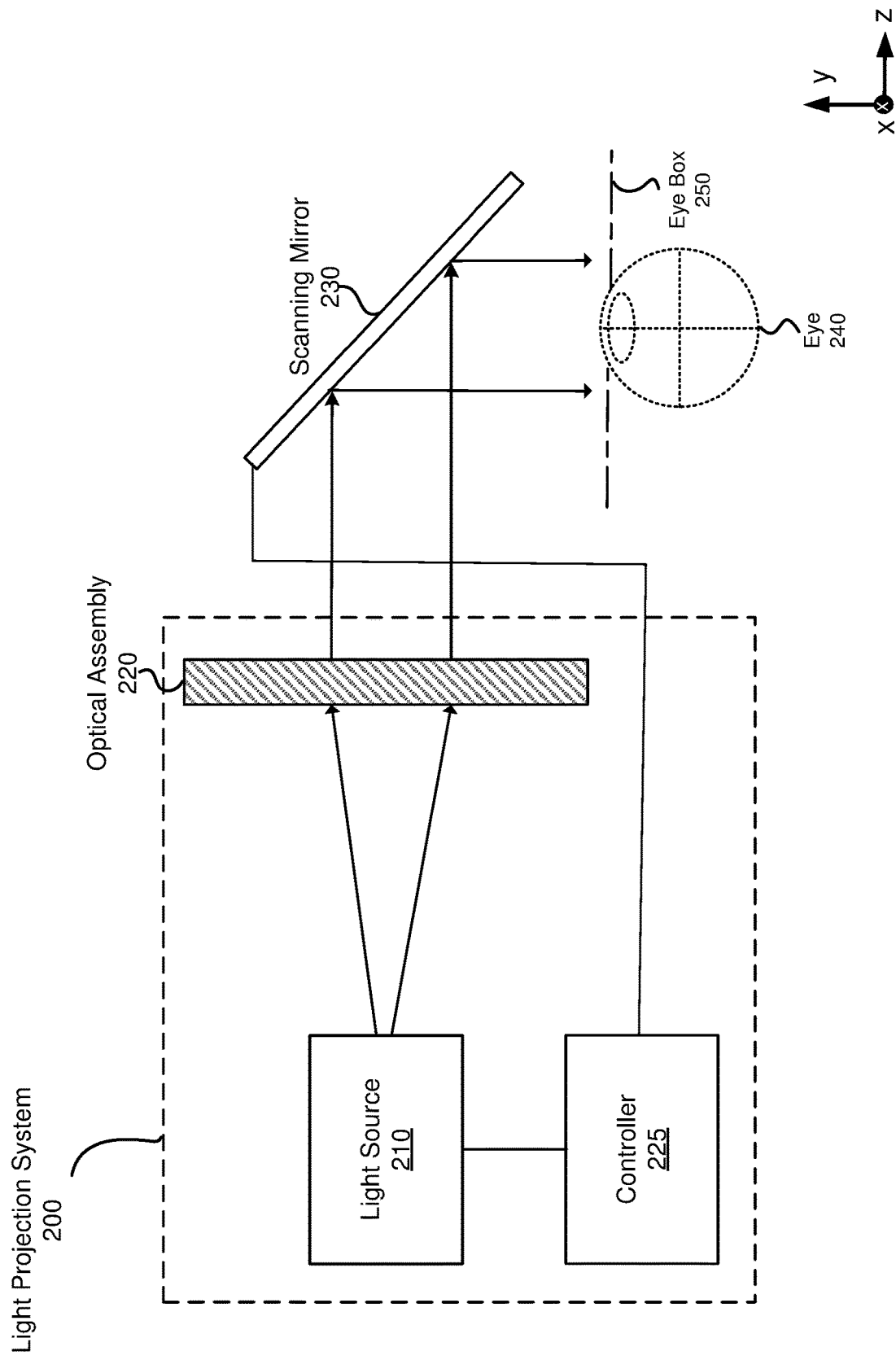
FIG. 2 illustrates a light projection system for correcting differential distortion, which may be part of the NED in FIG. 1A, in accordance with one or more embodiments.

FIG. 2 illustrates a light projection system 200 for correcting differential distortion, in accordance with one or more embodiments. In some embodiments, the light projection system 200 is a component of the NED 100 in FIG. 1A. For example, the light projection system 200 may be part of the display assembly 160 of FIG. 1B. In alternate embodiments, the light projection system 200 is part of some other NED, or other system that directs display image light to a particular location.

The light projection system 200 is configured to correct for distortion of image light. The light projection system 200 includes a light source 210, an optical assembly 220, and a controller 225 coupled to the light source 210. The light projection system 200 may be coupled to the scanning mirror 230, e.g., via the controller 225. For purposes of illustration, FIG. 2 shows the light projection system 200 associated with a single eye 240, but in some embodiments, another light projection system separate (or partially separate) from the light projection system 200, provides image light to another eye of the user. In a partially separate system, one or more components may be shared between light projection systems for each eye.

The light source 210 generates and outputs image light to the optical assembly 220. The light source 210 may be implemented as one or more strip sources. A strip source can be implemented as a rectangular array of light emitters that emit light of same or different wavelengths. A light emitter may be, e.g., a light emitting diode (LED), a microLED, a laser diode, some other device that emits light, or some combination thereof. A strip source may be implemented as a one-dimensional array of light emitters (e.g., 1×1000 light emitters or pixels) or as a two-dimensional array of light emitters (e.g., 10×1000 light emitters or pixels). In some embodiments, the light source 210 is monochromatic. In other embodiments, the light source 210 is polychromatic. For example, in some embodiments, a strip source in the light source 210 may include sub-pixels that emit light of different colors (e.g., red, green, and blue). The light source 210 may emit image light in one or more bands, which may include, e.g., visible light and/or infrared light. In some embodiments, the light source 210 includes one or more microlenses positioned to adjust an orientation of light emitted by the light source 210. In some embodiments, each light emitter of the light source 210 has a corresponding microlens. In other embodiments, a single microlens may direct light from a plurality of light emitters of the light source 210. In some embodiments, the strip source integrated into the light source 210 is implemented as a linear array of micro-light emitting diodes, a linear array of vertical cavity emitting lasers, some other array of light emitters, or combination thereof. In some embodiments, emission of light from light emitters in the light source 210 is controlled based on emission instructions from the controller 225.

The optical assembly 220 provides positive optical power to image light emitted from the light source 210 and optically corrects the emitted image light. The optical assembly 220 includes a plurality of optical elements, e.g., lenses. The plurality of optical elements of the optical assembly 220 are configured to correct differential distortion across a field of view (FOV) within a threshold amount, based on asymmetry of the plurality of optical elements relative to an optical axis shared by the plurality of optical elements. The optical elements may include, e.g., one or more concave lenses, one or more convex lenses, Fresnel lens, diffractive lenses, meta lenses, an anamorphic surface, a freeform surface, a Zernike polynomial surface, a Chebychev polynomial surface, some other form of asymmetric surface, some other form of symmetric surface, or some combination thereof. The asymmetric surfaces may be used in combination with one or more symmetric surfaces. An optical element in the optical assembly 220 may include a rotationally asymmetric surface and a rotationally symmetric surface. In one embodiment, an optical element in the optical assembly 220 includes one or more mirrors and one or more refractive surfaces.

The optical assembly 220 may correct for differential distortion along a long axis (e.g., x axis, as set by the strip source) and/or a short axis (e.g., y axis). In some embodiments, the optical elements of the optical assembly 220 are designed to correct for the differential distortion using rotationally symmetric elements with just decenter which can ease manufacturing. The correction achieved by the optical assembly 220 differs from typical optical distortion correction. Instead of correcting for differential distortion, the optical assembly 220 controls a rate of change of the differential distortion across a scan field (e.g., over portions of the x-z plane). For example, the optical assembly 220 decreases keystone distortion along a scan direction of the scanning mirror 230 and limits the rate of change between rows perpendicular to the scan direction. In some embodiments, in addition to controlling the rate of change of differential distortion across the scan field, the optical assembly 220 is configured to correct for chromatic aberration, some other distortion, some other aberration, or some combination thereof. More details about structure and operation of the optical assembly 220 are provided in conjunction with FIGS. 4A-4C.

The controller 225 may generate emission instructions and provide the emission instructions to one or more light emitters of the light source for controlling emission of light from the light source 210. In addition, the controller 225 may be coupled to the scanning mirror 230, e.g., via one or more positioners (not shown in FIG. 2) for controlling position of the scanning mirror 230 and moving a scan field across a FOV of the eye 240.

The scanning mirror 230 is positioned to in-couple image light optically corrected by the optical assembly 220 and to reflect the optically corrected image light to an eye box 250 of the user's eye 240. The scanning mirror 230 scans the optically corrected image light in at least one direction of a user's FOV, and provides the optically corrected image light to a particular portion of user's viewing field, e.g., based on instructions from the controller 225. The scanning mirror 230 may be implemented as a reflective surface of a specific reflective efficiency. The scanning mirror 230 may be coated with a metal or dichroic coating to reflect image light of a certain wavelength or a range of wavelengths. The scanning mirror 230 can scan in one or more dimensions to fill a scan field (e.g., over portions of the x-z plane) with light from the light projection system 200. The scanning mirror 230 may operate to sequentially reflect light emitted from different rows of light emitters in the light source 210 onto the scan field.

Figure 3A:
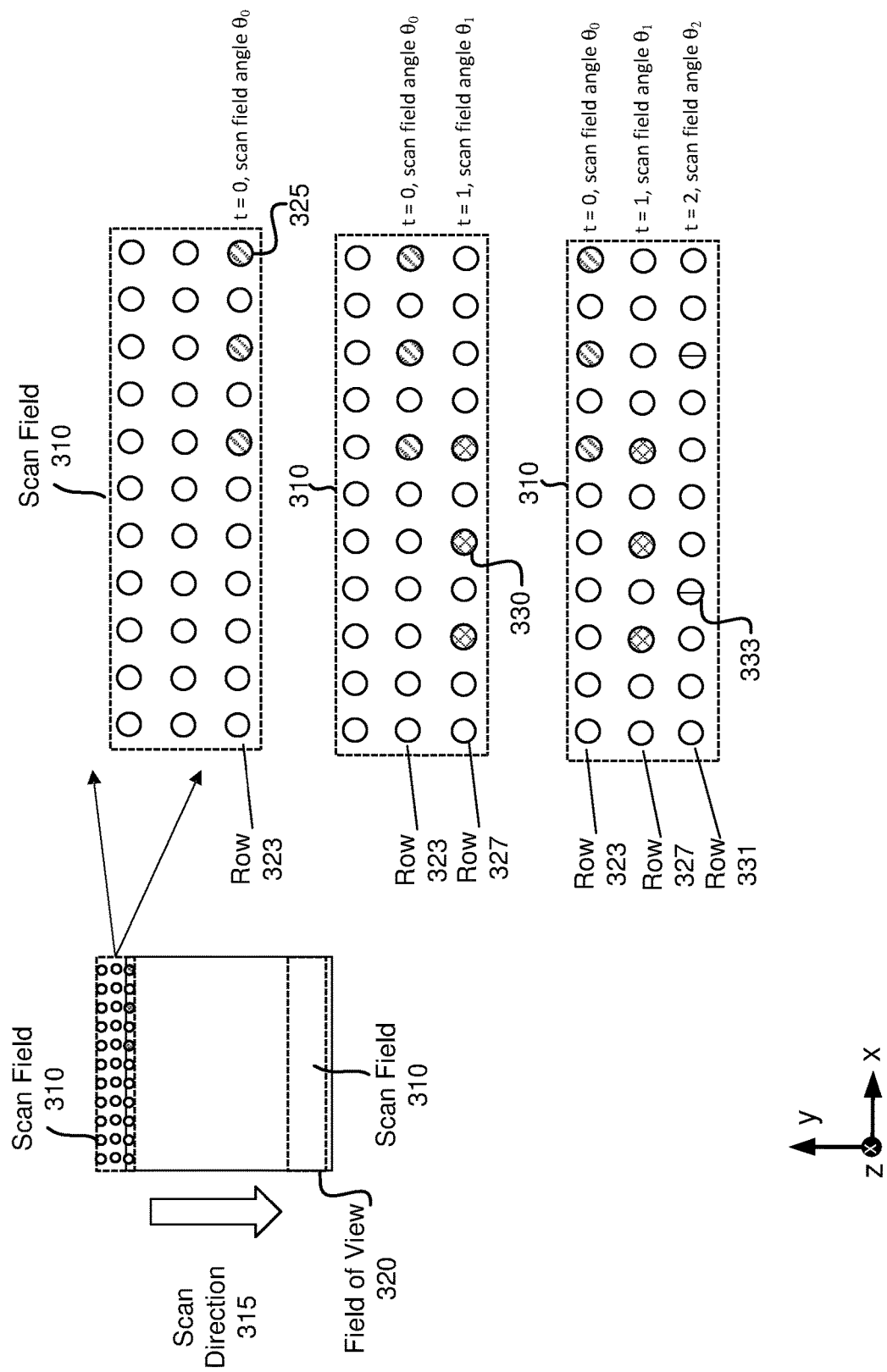
FIG. 3A illustrates a viewer scan field, in accordance with one or more embodiments.

FIG. 3A illustrates a viewer scan field 310 moving across a FOV 320, in accordance with one or more embodiments.

The scan field 310 can be moved in e.g., a scan direction 315 by appropriately positioning the scanning mirror 230 based on instructions from the controller 225 in FIG. 2. Each dot (pixel) of the scan field 310 represents an intersection of perpendicular scanning lines (e.g., horizontal and vertical scanning lines) and corresponds to a FOV location of a beam of light reaching a user's eye, e.g., the eye 240 in FIG. 2. The scan field 310 may be part of a multi-line operation scanning a plurality of pixels that form an x-y grid. The moving scan field 310 shown in FIG. 3A has three horizontal lines, but is not limited thereto. For example, the moving scan field 310 may have more than three lines for longer dwelling.

The scan field 310 illustrated in FIG. 3A can be moved according to the scan direction 315 (e.g., along y axis) to scan the entire user's FOV 320, e.g., by appropriately positioning the scanning mirror 230 in FIG. 2 based on instructions from the controller 225. To improve system brightness, the scanning presented herein provided by the scanning mirror 230 allows for longer dwelling at each angular field of the user's FOV 320 during the scanning. In this case, one row of pixels progressively enters the scan field 310 at a particular time instant and shows a new scene for presentation to the user. This progression of the scan field 310 is illustrated in FIG. 3A for three different time instants.

At a first instant of time (e.g. t=0), as the scan field 310 moves along y axis in the scan direction 315, a row 323 of pixels 325 corresponding to scan field angle $\theta_0$ enters the scan field 310. At a second instant of time (e.g. t=1), as the scan field 310 continues to move along y axis in the scan direction 315, a row 314 of pixels 330 corresponding to scan field angle $\theta_1$ enters the scan field 330. As shown in FIG. 3A, the row 312 now becomes a middle row in the scan field 310. At a third instant of time (e.g., t=2), as the scan field 310 continues to move along y axis in the scan direction 315, a row 331 of pixels 333 corresponding to scan field angle $\theta_2$ enters the scan field 310. As shown in FIG. 3A, the row 323 now becomes a top row in the scan field 310 and the row 327 becomes a middle row in the scan field 310. By keeping each row of pixels in the scan field 310 over a plurality of time instances, longer dwelling at each angular field is achieved, thus providing improved system brightness.

Figure 3B:
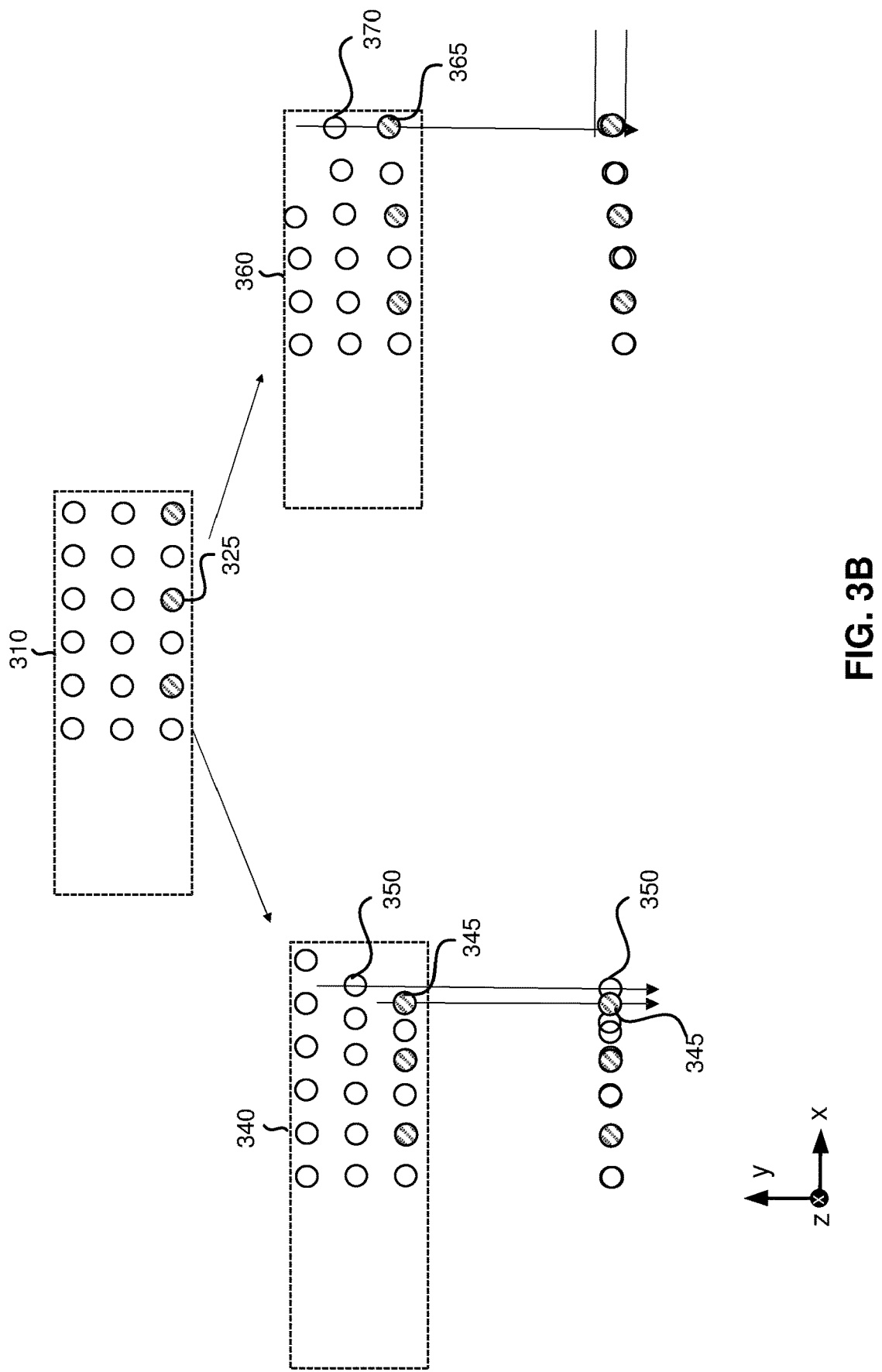
FIG. 3B illustrates differential distortion along row direction of a field-of-view (FOV) and differential distortion along column direction of the FOV during scanning, in accordance with one or more embodiments.

FIG. 3B illustrates differential distortion along row direction (e.g., along y direction) of a viewer FOV and differential distortion along column direction (e.g., along x dimension) of a viewer FOV during scanning, in accordance with one or more embodiments. Differential distortion is an amount of alteration along at least one space dimension of image light beams emitted from the light source 210 and reflected from a reflection area (pixel) of the scanning mirror 230. A viewer experiences the differential distortion as blurred image light along a specific dimension (e.g., x dimension and/or y dimension). The scan field 310 shown in FIGS. 3A-3B may correspond to a user's view of ideal projection. A scan field 340 shown in FIG. 3B illustrates a user's view with differential distortion along x axis. Due to distortion of scanning lines along x axis (columns), pixels of same angular fields do not perfectly align over a plurality of time instants. Instead, the pixels of the same angular fields only partially overlap. As shown in FIG. 3B, pixels 345 and 350 of the same scan field angle only partially overlap. Thus, instead of seeing increased brightness due to longer dwelling, the user sees a progressive wider column, which appears as a blurred image (effective pixels may also appear dimmer). This particular distortion that occurs during scanning can be referred to as differential distortion, e.g., along x axis.

A scan field 360 shown in FIG. 3B illustrates a user's view with differential distortion along y axis (along row direction). Due to distortion of scanning lines along y axis (rows), pixels of same angular fields do not perfectly align over a plurality of time instants. Instead, the pixels of the same angular fields only partially overlap. As shown in FIG. 3B, pixels 365 and 370 of the same scan field angle only partially overlap. Thus, instead of seeing increased brightness due to longer dwelling, the user sees a progressive wider row, which appears as a blurred image. This particular distortion that occurs during scanning can be referred to as differential distortion, e.g., along y axis.

Differential distortion may cause lines at a strip source (e.g., the light source 210) to map to curves in a scan field, which in turn degrades the modulation transfer function (MTF) as passing pixels up the strip source cause a blur. As discussed above, the blur may involve distortion along the scan direction, e.g., along y axis. Also, the blur may involve distortion along a direction perpendicular to the scan direction, e.g., along y axis. In addition, the pixel dimming can be observed, which is a function of uncorrected differential distortion. Furthermore, certain visual artifacts (e.g., streaking) may be present in the image due to the differential distortion.

Figure 4A:
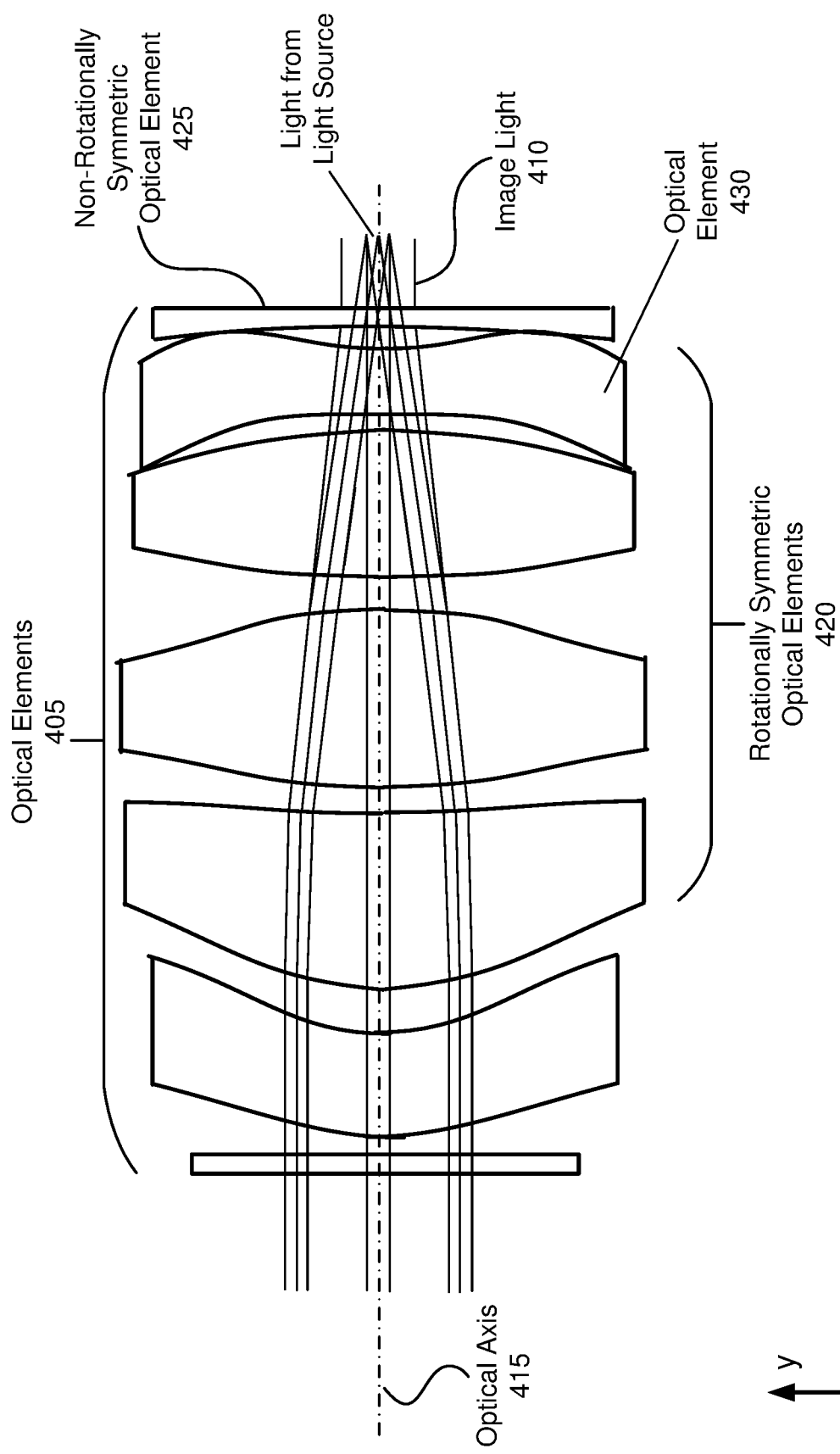
FIG. 4A illustrates an example optical assembly of the light projection system in FIG. 2, the optical assembly comprises a plurality of optical elements with asymmetry relative to an optical axis, in accordance with one or more embodiments.

FIG. 4A illustrates an example optical assembly 400, in accordance with one or more embodiments. The optical assembly 400 may be an embodiment of the optical assembly 220 of the light projection system 200 in FIG. 2. The optical assembly 400 comprises a plurality of optical elements 405 (e.g., lenses) positioned in series. The optical elements 405 optically correct image light 410 emitted from a light source (not shown in FIG. 4A) and provide positive optical power to the image light 410 directed to a user's eye (not shown in FIG. 4A). The plurality of optical elements 405 are configured to correct differential distortion related to the image light 410 across at least one of a long axis (e.g., x axis) and a short axis (e.g., y axis) of the FOV. In some embodiments, as shown in FIG. 4A, the plurality of optical elements 405 include multiple convex lenses and multiple concave lenses. In some other embodiments (not shown in FIG. 4A), the plurality of optical elements 405 include at least one convex lens and at least one concave lens. In the example illustrated by FIG. 4A, the thickness of the optical elements 405 ranges from 0.2 to 2.5 mm and the spacing between each of the optical elements 405 ranges from 0.2 to 5 mm. The optical elements 405 may be composed of a zinc sulfide film, EP5000 material, high-transparent thermoplastic resin K26R, other optically transparent material, or some combination thereof. K26R is a specific type of plastic (e.g., referred to as a "crown") with a relatively low refractive index and low dispersion. EP5000 is a glass material (e.g., referred to as a "flint") having a relatively high refractive index and high dispersion. The combination of "crown" and "flint" can be suitable for correcting chromatic aberration. In some embodiments, the optical element 430 is composed of EP5000 or combination of K26R and EP5000. Zinc sulfide film has a high refractive index. In some embodiments, the non-rotationally symmetric optical element 425 is composed of the zinc sulfide film. In some other embodiments, the non-rotationally symmetric optical element 425 is composed of some other plastic material having a high refractive index that limits an amount of bending by the optical elements 405.

The plurality of optical elements 405 of the optical assembly 400 are configured to correct differential distortion related to the image light 410 across a FOV within a threshold amount, based on asymmetry of the plurality of optical elements 405 relative to an optical axis 415 shared by the plurality of optical elements 410. In some embodiments, the plurality of optical elements 405 having asymmetry relative to the optical axis 415 includes a plurality of rotationally symmetric optical elements 420, wherein at least one of the rotationally symmetric elements 420 is decentered relative to the optical axis 415. In some other embodiments, the plurality of optical elements 405 having asymmetry relative to the optical axis 415 includes one or more non-rotationally symmetric optical elements, such as a non-rotationally symmetric element 425. In an embodiment, the non-rotationally symmetric optical element 425 may be decentered relative to the optical axis 415 to break optical symmetry of the optical elements 405. In one or more embodiments, the non-rotationally symmetric optical element 425 is implemented as an anamorphic surface which breaks the optical symmetry of the plurality of optical elements 405. In one embodiment, the non-rotationally symmetric optical element 425 may be an anamorphic surface decentered relative to the optical axis 415. In the illustrative embodiment of FIG. 4A, the non-rotationally symmetric optical element 425 is coupled to an exterior rotationally symmetric optical element 430 of the rotationally symmetric optical elements 420. In alternative embodiments, the non-rotationally symmetric optical element 425 can be placed in any other position within the rotationally symmetric optical elements 420.

Figure 4B:
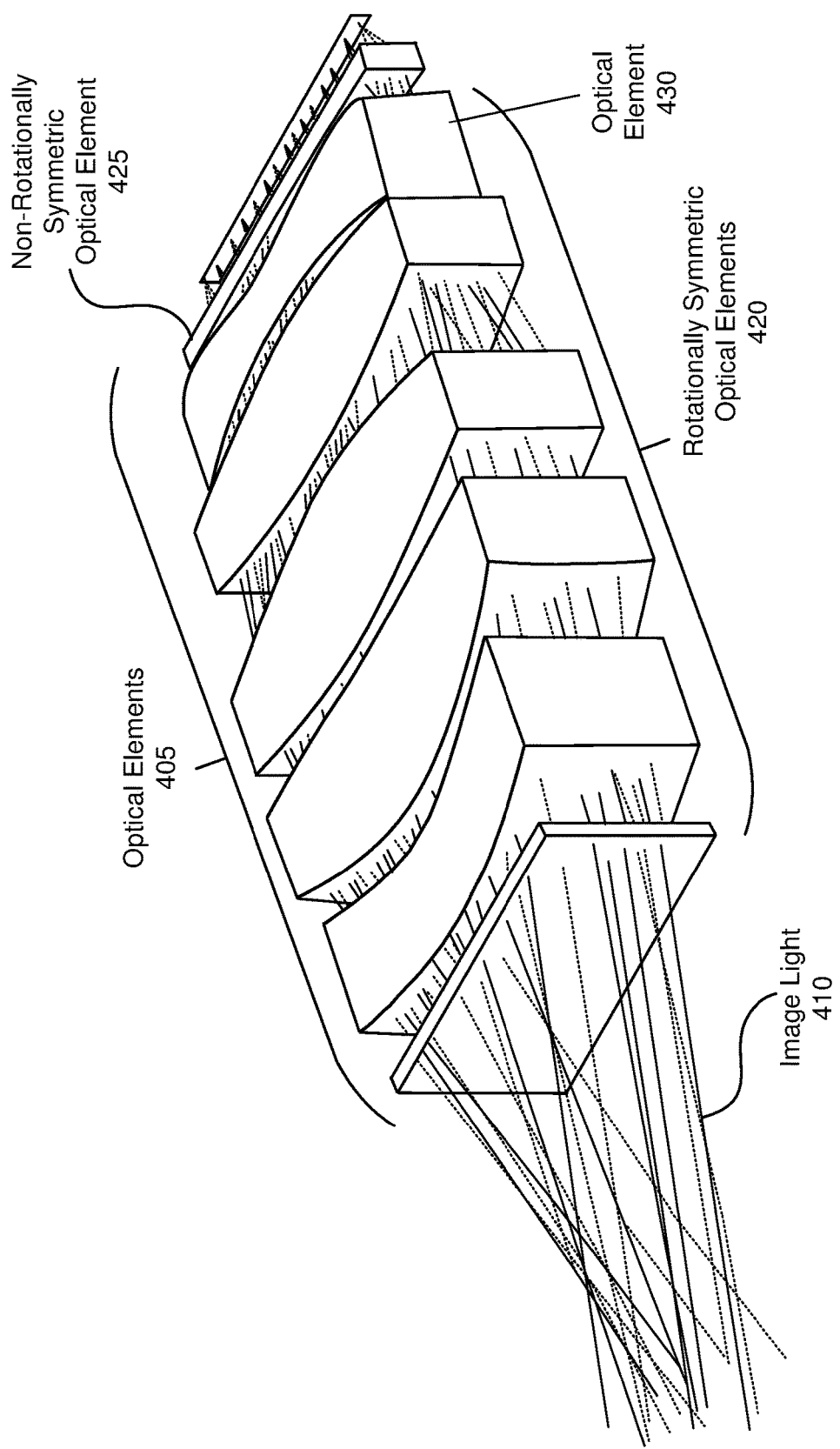
FIG. 4B illustrates an alternative view of the optical assembly in FIG. 4A, in accordance with one or more embodiments.

FIG. 4B illustrates an alternative view of the optical assembly 400 in FIG. 4A, in accordance with one or more embodiments. The optical assembly 400 is described above in detail with reference to FIG. 4A.

Figure 4C:
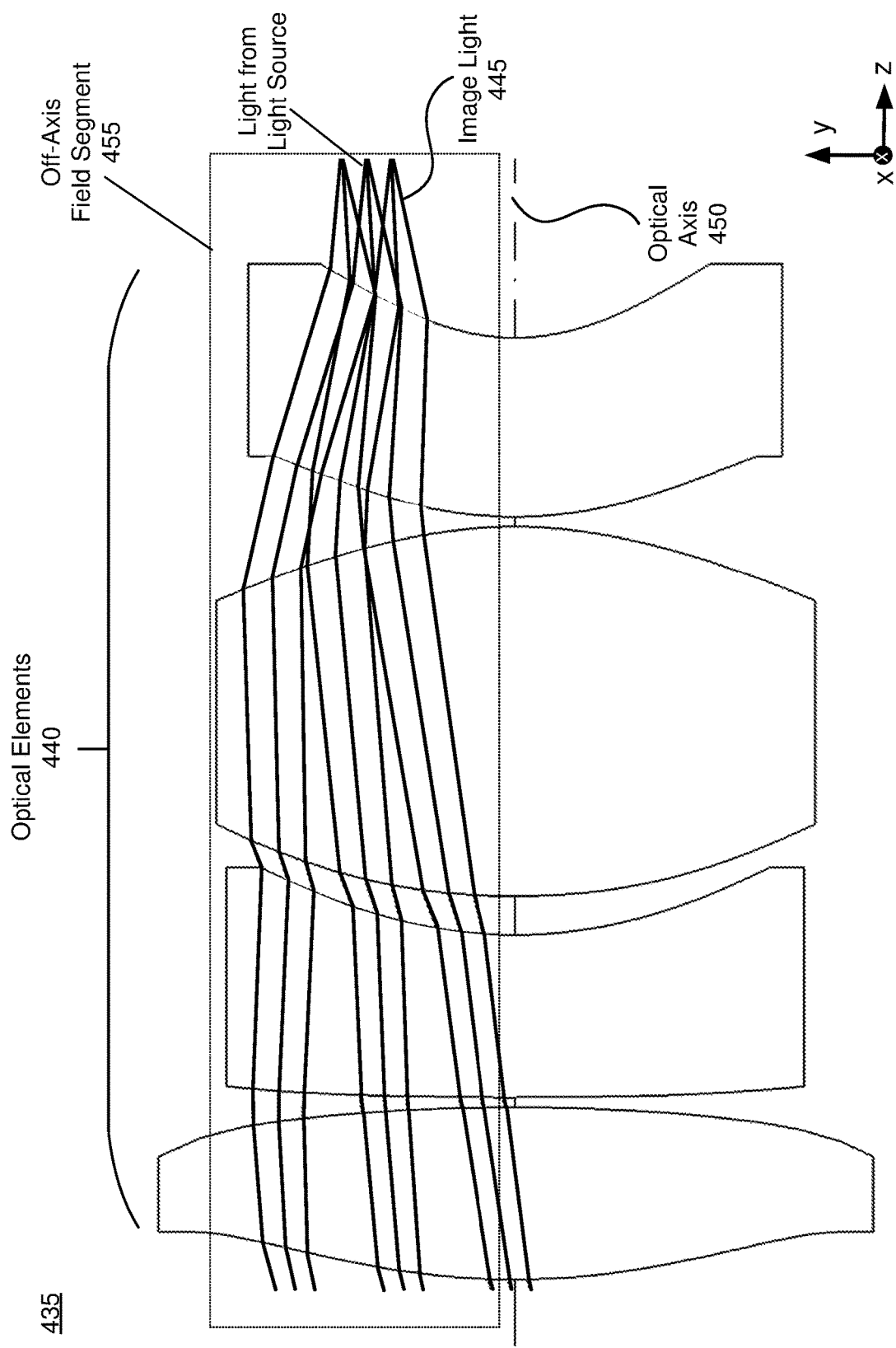
FIG. 4C illustrates an example optical assembly of the light projection system in FIG. 2, the optical assembly comprising a plurality of optical elements that achieve asymmetry relative to an optical axis by propagating the image light using an off-axis field segment of the optical elements, in accordance with one or more embodiments.

FIG. 4C illustrates an example optical assembly 435, in accordance with one or more embodiments. The optical assembly 435 may be an embodiment of the optical assembly 220 of the light projection system 200 in FIG. 2. The optical assembly 435 includes a plurality of rotationally symmetric optical elements 440, e.g., lenses positioned in series. In the example illustrated by FIG. 4C, the thickness of the optical elements 440 ranges between 1.5 and 4.0 mm and the spacing between each of the optical elements 440 ranges from 0.1 to 0.5 mm. The optical elements 440 may be composed of E48R material, EP5000 material, other optically transparent material, or some combination thereof. The optical elements 440 optically correct image light 445 emitted from a light source (not shown in FIG. 4C) and provide positive optical power to the image light 445 directed to a user's eye (not shown in FIG. 4C). The rotationally symmetric optical elements 440 may include at least one concave lens and at least one convex lens. In some embodiments, asymmetry relative to an optical axis 450 shared by the rotationally symmetric optical elements 440 is achieved by propagating the image light 445 using an off-axis field segment 455 of the rotationally symmetric optical elements 440. The off-axis field segment 455 is a segment of the optical elements 440 that is located off the optical axis 450 and is asymmetric relative to the optical axis 450. The line segment has a displacement relative to the optical axis 450. Note that a distortion field produced by a rotationally symmetric system is symmetric about an optical axis. By using the off-axis field segment 455, a section of the symmetric field is selected where the section itself is not fully symmetric, e.g., may have left and right symmetry but not top and bottom symmetry. In this manner, based on the achieved optical asymmetry, the differential distortion across at least one of a long axis (e.g., x axis) and a short axis (e.g., y axis) of a FOV may be corrected within a threshold amount.

Figure 4D:
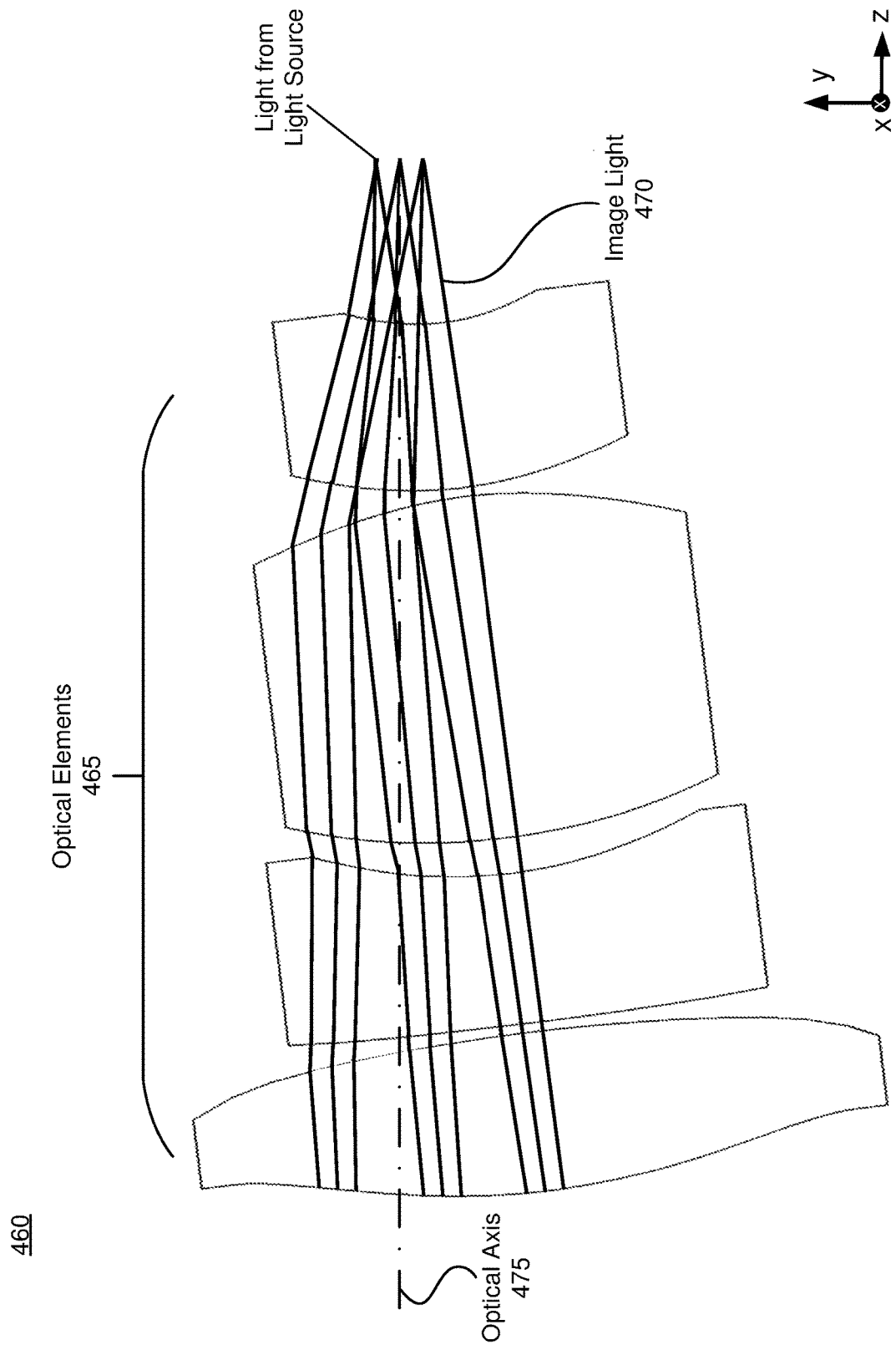
FIG. 4D illustrates an example optical assembly of the light projection system in FIG. 2, the optical assembly comprises a plurality of optical elements with asymmetry relative to an optical axis based on tilting of at least one of the optical elements relative to the optical axis, in accordance with one or more embodiments.

FIG. 4D illustrates an example optical assembly 460, in accordance with one or more embodiments. The optical assembly 460 may be an embodiment of the optical assembly 220 of the light projection system 200 in FIG. 2. The optical assembly 460 includes a plurality of rotationally symmetric optical elements 465, e.g., lenses positioned in series. In the example illustrated by FIG. 4D, the thickness of the optical elements 465 and the spacing between each of the optical elements 465 are substantially similar to that of the optical elements 440 of FIG. 4C. In some other embodiments, the optical assembly 460 includes five rotationally symmetric optical elements (not shown in FIG. 4D) where the thickness of the optical elements ranges from 1 to 2 mm and the spacing between each of the optical elements ranges from 0.1 to 0.5 mm. The optical elements 465 may be composed of EP5000 material, high-transparent thermoplastic resin K26R, other optically transparent material, or some combination thereof. The optical elements 465 optically correct image light 470 emitted from a light source (not shown in FIG. 4D) and provide positive optical power to the image light 470 directed to a user's eye (not shown in FIG. 4D). The rotationally symmetric optical elements 465 may include at least one concave lens and at least one convex lens. In some embodiments, asymmetry relative to an optical axis 475 shared by the plurality of rotationally symmetric optical elements 465 is achieved based on tilting at least one of the optical elements 465 relative to the optical axis 475. In the illustrative embodiment of FIG. 4D, each of the rotationally symmetric optical elements 465 is tilted along z axis relative to the optical axis 475. In another embodiment (not shown in FIG. 4D), only one of the rotationally symmetric optical elements 465 is tilted along z axis to achieve optical asymmetry relative to the optical axis 475. In yet another embodiment (not shown in FIG. 4D), two or more of the rotationally symmetric optical elements 465 are tilted along z axis to achieve optical asymmetry relative to the optical axis 475. In yet another embodiment, to achieve optical asymmetry relative to the optical axis 475, at least one of the rotationally symmetric optical elements 465 is tilted along z axis and one or more of the rotationally symmetric optical elements 465 are decentered relative to the optical axis 475. In this manner, based on the achieved optical asymmetry, the differential distortion across at least one of a long axis (e.g., x axis) and a short axis (e.g., y axis) of a FOV may be corrected within a threshold amount.

System Environment

Figure 5:
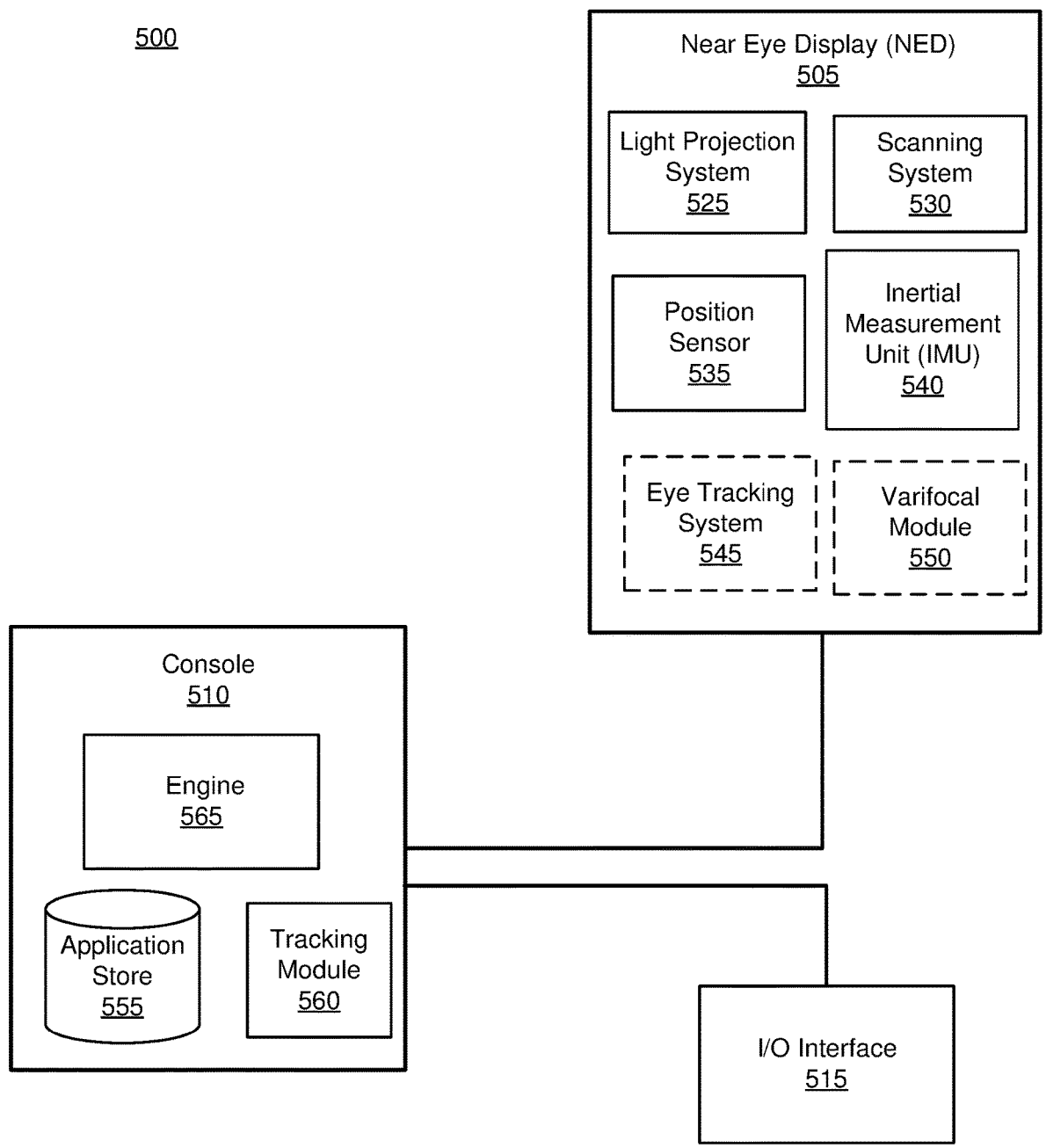
FIG. 5 is a block diagram of a system environment that includes the NED shown in FIG. 1A, in accordance with one or more embodiments.

FIG. 5 is a block diagram of one embodiment of a NED system 500 in which a console 510 operates. The NED system 500 may operate in an artificial reality system environment, e.g., a VR system environment, an AR system environment, a MR system environment, or some combination thereof. The NED system 500 shown by FIG. 5 comprises a NED 505 and an input/output (I/O) interface 515 that is coupled to the console 510. While FIG. 5 shows an example NED system 500 including one NED 505 and on I/O interface 515, in other embodiments any number of these components may be included in the NED system 500. For example, there may be multiple NEDs 505 each having an associated I/O interface 515, with each NED 505 and I/O interface 515 communicating with the console 510. In alternative configurations, different and/or additional components may be included in the NED system 500. Additionally, functionality described in conjunction with one or more of the components shown in FIG. 5 may be distributed among the components in a different manner than described in conjunction with FIG. 5 in some embodiments. For example, some or all of the functionality of the console 510 is provided by the NED 505.

The NED 505 is a near-eye display or a head-mounted display that presents content to a user comprising virtual and/or augmented views of a physical, real-world environment with computer-generated elements (e.g., two-dimensional or three-dimensional images, two-dimensional or three-dimensional video, sound, etc.). In some embodiments, the presented content includes audio that is presented via an external device (e.g., speakers and/or headphones) that receives audio information from the NED 505, the console 510, or both, and presents audio data based on the audio information. The NED 505 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the NED 505 is the NED 100 described above in conjunction with FIG. 1A.

The NED 505 may include a light projection system 525, a scanning system 530, one or more position sensors 535, an IMU 540, an optional eye tracking system 545, and an optional varifocal module 550. Some embodiments of the NED 505 have different components than those described in conjunction with FIG. 5. Additionally, the functionality provided by various components described in conjunction with FIG. 5 may be differently distributed among the components of the NED 505 in other embodiments.

The light projection system 525 includes a light source that emits image light and an optical assembly that provides positive optical power to the image light and optically correct the image light. The optical assembly of the light projection system 525 includes a plurality of optical elements that corrects differential distortion related to the image light across a FOV within a threshold amount, based on asymmetry of the plurality of optical elements relative to an optical axis shared by the plurality of optical elements. An embodiment of the light projection system 525 is the light projection system 200 described above in conjunction with FIG. 2. Embodiments of the optical assembly of the light projection system 525 can be the optical assembly 400, the optical assembly 435 and/or the optical assembly 460 described above in conjunction with FIGS. 4A-4C.

The optical assembly of the light projection system 525 may further magnify image light received from the light source of the light projection system 525, correct optical errors associated with the image light, and present the corrected image light to a user of the NED 505. The optical assembly of the light projection system 525 includes a plurality of optical elements. Example optical elements included in the optical assembly include: an aperture, a Fresnel lens, a convex lens, a concave lens, a filter, a reflecting surface, or any other suitable optical element that affects image light. Moreover, the optical assembly of the light projection system 525 may include combinations of different optical elements. In some embodiments, one or more of the optical elements in the optical assembly may have one or more coatings, such as partially reflective or anti-reflective coatings.

Magnification and focusing of the image light by the optical assembly of the light projection system 525 allows the projection system 525 to be physically smaller, weigh less and consume less power than larger projection systems or displays. Additionally, magnification may increase the field of view of the content presented by the projection system 525. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optical assembly of the projection system 525 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error.

The scanning system 530 includes a scanning mirror that scans the optically corrected image light in at least one dimension of the FOV and direct the scanned image light to an eye box of the NED corresponding to a location of a user's eye. Position of the scanning mirror of the scanning system 530 can be adjusted based in part on instructions from the NED 505, e.g., a controller of the NED 505. An embodiment of the scanning system 530 is the scanning mirror 230 described above in conjunction with FIG. 2.

The IMU 540 is an electronic device that generates data indicating a position of the NED 505 based on measurement signals received from one or more of the position sensors 535. The measurement signals indicating the position of the NED 505 may also include depth information received from a depth camera assembly (DCA) integrated into a frame of the NED 505 (not shown in FIG. 5) or from some other imaging device (camera) external to the NED 505. The DCA of the NED 505 or the external camera may capture data describing depth information of a local area surrounding some or all of the NED 505. The DCA (or the external camera) can also determine the depth information. Alternatively, the DCA (or the external camera) sends the captured data to another device such as the console 510 that can determine the depth information using the captured data from the DCA (or the external camera). A position sensor 535 generates one or more measurement signals in response to motion of the NED 505. Examples of position sensors 535 include: one or more accelerometers, one or more gyroscopes, one or more magnetometers, another suitable type of sensor that detects motion, a type of sensor used for error correction of the IMU 540, or some combination thereof. The position sensors 535 may be located external to the IMU 540, internal to the IMU 540, or some combination thereof.

Based on the one or more measurement signals from one or more position sensors 535, the IMU 540 generates data indicating an estimated current position of the NED 505 relative to an initial position of the NED 505. For example, the position sensors 535 include multiple accelerometers to measure translational motion (forward/back, up/down, left/right) and multiple gyroscopes to measure rotational motion (e.g., pitch, yaw, roll). In some embodiments, the IMU 540 rapidly samples the measurement signals and calculates the estimated current position of the NED 505 from the sampled data. For example, the IMU 540 integrates the measurement signals received from the accelerometers over time to estimate a velocity vector and integrates the velocity vector over time to determine an estimated current position of a reference point on the NED 505. Alternatively, the IMU 540 provides the sampled measurement signals to the console 510, which interprets the data to reduce error. The reference point is a point that may be used to describe the position of the NED 505. The reference point may generally be defined as a point in space or a position related to the NED's 505 orientation and position.

The IMU 540 receives one or more parameters from the console 510. The one or more parameters are used to maintain tracking of the NED 505. Based on a received parameter, the IMU 540 may adjust one or more IMU parameters (e.g., sample rate). In some embodiments, certain parameters cause the IMU 540 to update an initial position of the reference point so it corresponds to a next position of the reference point. Updating the initial position of the reference point as the next calibrated position of the reference point helps reduce accumulated error associated with the current position estimated the IMU 540. The accumulated error, also referred to as drift error, causes the estimated position of the reference point to "drift" away from the actual position of the reference point over time. In some embodiments of the NED 505, the IMU 540 may be a dedicated hardware component. In other embodiments, the IMU 540 may be a software component implemented in one or more processors.

In some embodiments, the eye tracking system 545 is integrated into the NED 505. The eye tracking system 545 determines eye tracking information associated with an eye of a user wearing the NED 505. The eye tracking information determined by the eye tracking system 545 may comprise information about a position of the user's eye, i.e., information about an angle of an eye-gaze. The eye-tracking system 545 may comprise one or more illumination sources and an imaging device (camera).

In some embodiments, the varifocal module 550 is further integrated into the NED 505. The varifocal module 550 may be coupled to the eye tracking system 545 to obtain eye tracking information determined by the eye tracking system 545. The varifocal module 550 may be configured to adjust a location of an image plane (location at which content appears to be located to a wearer of the NED 505) of the NED 505, based on the determined eye tracking information obtained from the eye tracking system 545. In this way, the varifocal module 550 can mitigate vergence-accommodation conflict in relation to the image light. The varifocal module 550 can be interfaced (e.g., either mechanically or electrically) with at least one optical element of the optical assembly of the light projection system 525. Then, the varifocal module 550 may be configured to adjust a location of the image plane. The varifocal module 550 may adjust a location of the image plane by, e.g., adjusting a position of one or more optical elements in and/or external to the light projection system 525, adjusting an optical power of the one or more optical elements (e.g., a liquid lens, a liquid crystal lens, a Pancharatnam Berry Phase liquid crystal lens, etc.) in and/or external to the light projection system 525, or some combination thereof.

The I/O interface 515 is a device that allows a user to send action requests and receive responses from the console 510. An action request is a request to perform a particular action. For example, an action request may be an instruction to start or end capture of image or video data or an instruction to perform a particular action within an application. The I/O interface 515 may include one or more input devices. Example input devices include: a keyboard, a mouse, a game controller, or any other suitable device for receiving action requests and communicating the action requests to the console 510. An action request received by the I/O interface 515 is communicated to the console 510, which performs an action corresponding to the action request. In some embodiments, the I/O interface 515 includes an IMU 540 that captures calibration data indicating an estimated position of the I/O interface 515 relative to an initial position of the I/O interface 515. In some embodiments, the I/O interface 515 may provide haptic feedback to the user in accordance with instructions received from the console 510. For example, haptic feedback is provided when an action request is received, or the console 510 communicates instructions to the I/O interface 515 causing the I/O interface 515 to generate haptic feedback when the console 510 performs an action.

The console 510 provides content to the NED 505 for processing in accordance with information received from one or more of: the NED 505, and the I/O interface 515. In the example shown in FIG. 5, the console 510 includes an application store 555, a tracking module 560, and an engine 565. Some embodiments of the console 510 have different modules or components than those described in conjunction with FIG. 5. Similarly, the functions further described below may be distributed among components of the console 510 in a different manner than described in conjunction with FIG. 5.

The application store 555 stores one or more applications for execution by the console 510. An application is a group of instructions, that when executed by a processor, generates content for presentation to the user. Content generated by an application may be in response to inputs received from the user via movement of the NED 505 or the I/O interface 515. Examples of applications include: gaming applications, conferencing applications, video playback applications, or other suitable applications.

The tracking module 560 calibrates the NED system 500 using one or more calibration parameters and may adjust one or more calibration parameters to reduce error in determination of the position of the NED 505 or of the I/O interface 515. Calibration performed by the tracking module 560 also accounts for information received from the IMU 540 in the NED 505 and/or an IMU 540 included in the I/O interface 515. Additionally, if tracking of the NED 505 is lost, the tracking module 560 may re-calibrate some or all of the NED system 500.

The tracking module 560 tracks movements of the NED 505 or of the I/O interface 515 using information from the one or more position sensors 535, the IMU 540, a DCA of the NED 505, some other external imaging device, or some combination thereof. For example, the tracking module 560 determines a position of a reference point of the NED 505 in a mapping of a local area based on information from the NED 505. The tracking module 560 may also determine positions of the reference point of the NED 505 or a reference point of the I/O interface 515 using data indicating a position of the NED 505 from the IMU 540 or using data indicating a position of the I/O interface 515 from an IMU 540 included in the I/O interface 515, respectively. Additionally, in some embodiments, the tracking module 560 may use portions of data indicating a position or the NED 505 from the IMU 540 to predict a future location of the NED 505. The tracking module 560 provides the estimated or predicted future position of the NED 505 or the I/O interface 515 to the engine 565.

The engine 565 generates a three-dimensional mapping of the area surrounding the NED 505 (i.e., the "local area") based on information received from the NED 505. In some embodiments, the engine 565 determines depth information for the three-dimensional mapping of the local area based on information received from the NED 505 that is relevant for techniques used in computing depth. The engine 565 may calculate depth information using one or more techniques in computing depth from the portion of the reflected light detected by the NED 505, such as the stereo based techniques, the structured light illumination technique, and the time-of-flight technique. In various embodiments, the engine 565 uses the depth information to, e.g., update a model of the local area, and generate content based in part on the updated model.

The engine 565 also executes applications within the NED system 500 and receives position information, acceleration information, velocity information, predicted future positions, or some combination thereof, of the NED 505 from the tracking module 560. Based on the received information, the engine 565 determines content to provide to the NED 505 for presentation to the user. For example, if the received information indicates that the user has looked to the left, the engine 565 generates content for the NED 505 that mirrors the user's movement in a virtual environment or in an environment augmenting the local area with additional content. Additionally, the engine 565 performs an action within an application executing on the console 510 in response to an action request received from the I/O interface 515 and provides feedback to the user that the action was performed. The provided feedback may be visual or audible feedback via the NED 505 or haptic feedback via the I/O interface 515.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A light projection system comprising:
a light source configured to emit image light; and
an optical assembly configured to provide a positive optical power to the image light and optically correct the image light, the optical assembly comprising a plurality of optical elements configured to correct differential distortion related to the image light across a field of view (FOV) within a threshold amount based on an optical asymmetry of the plurality of optical elements relative to an optical axis shared by the plurality of optical elements, the optical asymmetry achieved by at least decentering one or more optical elements of the plurality of optical elements relative to the optical axis.

2. The light projection system of claim 1, wherein the light projection system is part of a near-eye-display (NED).

3. The light projection system of claim 1, wherein the light source is a strip source.

4. The light projection system of claim 3, wherein the strip source is selected from a group consisting of a linear array of micro-light emitting diodes, and a linear array of vertical cavity emitting lasers.

5. The light projection system of claim 1, further comprising a scanning mirror configured to scan the optically corrected image light in at least one dimension of the FOV.

6. The light projection system of claim 1, wherein the plurality of optical elements having the optical asymmetry relative to the optical axis includes a plurality of rotationally symmetric elements, wherein at least one of the rotationally symmetric elements is decentered relative to the optical axis.

7. The light projection system of claim 1, wherein the plurality of optical elements having the optical asymmetry relative to the optical axis includes one or more non-rotationally symmetric elements.

8. The light projection system of claim 7, wherein the one or more non-rotationally symmetric elements include at least one anamorphic surface.

9. The light projection system of claim 1, wherein the plurality of optical elements having the optical asymmetry relative to the optical axis includes one or more non-rotationally symmetric elements decentered relative to the optical axis.

10. The light projection system of claim 1, wherein the plurality of optical elements having the optical asymmetry relative to the optical axis includes a plurality of rotationally symmetric elements, wherein at least one of the rotationally symmetric elements is tilted relative to the optical axis.

11. The light projection system of claim 1, wherein the optical assembly is configured to correct the differential distortion based on the optical asymmetry of the plurality of optical elements by propagating the image light using an off-axis field segment of the plurality of optical elements.

12. The light projection system of claim 1, wherein the plurality of optical elements having the optical asymmetry relative to the optical axis is configured to correct the differential distortion across at least one of a long axis and a short axis of the FOV.

13. The light projection system of claim 1, wherein the plurality of optical elements includes at least one convex lens and at least one concave lens.

14. A near-eye display (NED) comprising:
a light source configured to emit image light;
an optical assembly configured to provide a positive optical power to the image light and optically correct the image light, the optical assembly comprising a plurality of optical elements configured to correct differential distortion related to the image light across a field of view (FOV) within a threshold amount based on an optical asymmetry of the plurality of optical elements relative to an optical axis shared by the plurality of optical elements, the optical asymmetry achieved by at least decentering one or more optical elements of the plurality of optical elements relative to the optical axis; and
a scanning mirror configured to scan the optically corrected image light in at least one dimension of the FOV and direct the scanned image light to an eye-box of the NED corresponding to a location of a user's eye.

15. The NED of claim 14, wherein the plurality of optical elements having the optical asymmetry relative to the optical axis includes a plurality of rotationally symmetric elements, wherein at least one of the rotationally symmetric elements is decentered relative to the optical axis.

16. The NED of claim 14, wherein the plurality of optical elements having the optical asymmetry relative to the optical axis includes one or more non-rotationally symmetric elements.

17. The NED of claim 16, wherein the one or more non-rotationally symmetric elements include at least one anamorphic surface.

18. The NED of claim 14, wherein the plurality of optical elements having the optical asymmetry relative to the optical axis includes one or more non-rotationally symmetric elements decentered relative to the optical axis.

19. The NED of claim 14, wherein the plurality of optical elements having the optical asymmetry relative to the optical axis includes a plurality of rotationally symmetric elements, wherein at least one of the rotationally symmetric elements is tilted relative to the optical axis.

20. The NED of claim 14, wherein the optical assembly is configured to correct the differential distortion based on the optical asymmetry of the plurality of optical elements by propagating the image light using an off-axis field segment of the plurality of optical elements.

* * * * *